United States Patent [19]

Kobayashi et al.

[11] Patent Number: 5,248,938
[45] Date of Patent: Sep. 28, 1993

[54] INDUCTANCE TYPE ROTATIONAL POSITION SENSOR INCLUDING A MAGNETIC CORE HAVING FIXED AND MOVABLE SHORT RINGS

[75] Inventors: Masaki Kobayashi; Kazuma Shibata, both of Kosai, Japan

[73] Assignee: Asmo Co., Ltd., Japan

[21] Appl. No.: 887,142

[22] Filed: May 22, 1992

[30] Foreign Application Priority Data

May 24, 1991 [JP] Japan .................. 3-37344
Feb. 10, 1992 [JP] Japan .................. 4-4885

[51] Int. Cl.⁵ .............. G01B 7/30; H02K 11/00; H01F 21/02; G01R 27/26
[52] U.S. Cl. .................. 324/207.16; 310/68 B; 324/207.25; 336/45
[58] Field of Search ........... 324/207.13, 207.15, 324/207.16, 207.22, 207.23, 207.24, 207.25; 310/68 B; 336/30, 45, 79, 130

[56] References Cited
U.S. PATENT DOCUMENTS 3,973,191  8/1976  Zabler ............... 324/207.16
4,132,980  1/1979  Zabler ............... 324/207.16 X
4,338,815  7/1982  Peters et al. .

Primary Examiner—Gerard R. Strecker
Attorney, Agent, or Firm—Venable, Baetjer, Howard & Civiletti

[57] ABSTRACT

A substantially C-shaped core which is used in a rotational position sensor of an inductance type. The core is formed of a sensing side portion and a referencing side portion, each of which has an arc shape. The centers of the arc shapes are spaced apart from one another at a predetermined distance, thereby extending a movable range of a movable short ring. As a result, a rotational position can be detected over a wider range of degrees. The core is also formed of a core intermediate portion, which has laminated thin plates therein, and core opposite end portions, which are disposed in a sealed state on the top and bottom surfaces of the core intermediate portion. The core intermediate portion and the core opposite end portions are welded together at given points so as to form a one-piece body. Surfaces of the core can thereby be prevented from being deformed or detached.

25 Claims, 15 Drawing Sheets

INDUCTANCE TYPE ROTATIONAL POSITION SENSOR INCLUDING A MAGNETIC CORE HAVING FIXED AND MOVABLE SHORT RINGS

BACKGROUND OF THE INVENTION

1. Field of the Invention

The present invention relates to a rotational position sensor. More particularly, it relates to an inductance type rotational position sensor in which a rotational position of a rotational position-detected member is detected in accordance with variations in inductance of coils.

2. Description of the Related Art

Among rotational position sensors for detecting a rotational position of a motor and the like, there is an inductance type rotational position sensor for detecting rotational position in accordance with variations in inductance of coils. The inductance type rotational position sensor is provided with: a sensing side coil, which extends around the outermost circumference of a core and is displaceable along the core to induce a magnetic field having a high frequency; and, a movable short ring, which is disposed to permit movement thereof relative to the core.

In the rotational position sensor of this type, the core has a ring shape, which is concentric with a revolving shaft of the motor. The movable short ring is connected to the revolving shaft of the motor so as to turn jointly therewith. To be specific, the rotational position sensor is designed such that an interrupted position of a magnetic flux generated in the sensing side coil varies with a shifting position of the movable short ring turning jointly with the revolving shaft of the motor, thereby varying an inductance of the sensing side coil. In addition, in the same type of the rotational position sensor, a correcting side coil, i.e., a referencing side coil is disposed next to the sensing side coil, while a fixed short ring is anchored to the core in place where the correcting side coil lies. The correcting side coil and the fixed short ring serve to correct variations in the inductance of the sensing side coil influenced by temperature and the like.

Accordingly, when the inductance of the sensing side coil is compared with that of the correcting side coil, a rotational position of the revolving shaft of the motor can be detected on the basis of the resulting inductance value.

In conventional inductance type rotational position sensors of this type, spaces for screws and the like to be incorporated therein are essential before the fixed short ring is anchored to the core or the core itself is fixed. As previously described, the sensing side coil and the correcting side coil are provided around the core; and, the core is simply in the form of a ring that is concentric with the revolving shaft of the motor. A shiftable range of the movable short ring is thereby limited to a great degree. To be specific, the shiftable range of the movable short ring is limited when the spaces for fixing screws and the like are provided. This results in an inconvenience in which the rotational position of the revolving shaft of the motor is difficult to be detected over a wide range, i.e., over a wide angle range. A detectable scope of the rotational position sensor is thus reduced.

Furthermore, in the conventional inductance type rotational position sensors of this nature, different windings of the sensing side coil and the correcting side coil are coiled "in an exposed state" or "an impregnated state" before simply soldered to terminals. This increases the likelihood that the different windings are influenced by vibrations, jarring in the course of assembling work, or variations in ambient temperature. Therefore, improvements in reliability or durability must be achieved.

A high degree of reliability is required for the rotational position sensor. In the above-described rotational position sensor, the core preferably has a low level of loss because the rotational position sensor is designed to apply a high frequency to the referencing side coil and the sensing side coil, thereby detecting variations in the resulting magnetic fields. For this reason, the usual practice is to laminate thin plates such as silicic steel plates or permalloy so as to form an iron core.

However, in the core formed by laminated thin plates, a thin plate forming a surface of the core may be deformed or detached therefrom by vibration or the like. This causes an inconvenience in which the thin plate comes into contact with a turning movable short ring, thereby decreasing reliability of the rotational position sensor.

Sensing accuracy of the rotational position sensor depends largely on fine adjustment for successfully assembling the rotational position sensor. To be specific, an initial position of the movable short ring is shifted when a relative position between the rotational position sensor and an assembled component, such as the motor or the like, is out of line with a given position at which these are assembled. An initial value for an output voltage of the rotational position sensor (or, a graphical zero point illustrating sensor characteristics) in relation to the same rotational position is thereby shifted. In addition, in the rotational position sensor itself, a magnetic path for the referencing side coil varies when the fixed short ring on the core in relation to the referencing side coil assumes an out-of-line position of the fixed short ring. A variation ratio of the output voltage to the rotational position can be graphically depicted to illustrate sensor characteristics. As a result, problems arise in which characteristics of the rotational position sensor vary or sensing accuracy thereof decreases.

SUMMARY OF THE INVENTION

In view of the above-described sensor deficiencies, an object of the present invention is to provide a rotational position sensor of an inductance type, which can detect a rotational position over a wide range of rotation angles with increased reliability and durability.

According to the present invention, the rotational position sensor of an inductance type for detecting the rotational position of a rotational position-detected member is characterized by:

a core having a substantial C-shape, which is disposed radially around the rotational position-detected member so as to be spaced apart from the rotational position-detected member, the core being provided with a referencing side portion for formation of a referencing side magnetic path and a sensing side portion for formation of a sensing side magnetic path, and the core having an arc portion for each of the referencing side portion and the sensing side portion, in which the center of the arc portion of the referencing side portion is spaced apart at a predetermined distance from the center of the arc portion of the sensing side portion in a direction in which both of the arcs are away from one another;

a referencing side coil formed by a lead wire being wound around the arc portion of the referencing side portion;

a sensing side coil formed by a lead wire being wound around the arc portion of the sensing side portion;

a movable short ring, which is connected to the rotational position-detected member so as to be in alignment therewith, the movable short ring being disposed to permit turning thereof in relation to the arc portion of the sensing side portion, and the movable short ring shifting its position in relation to the arc portion of the sensing side portion according to the turning of the rotational position-detected member, thereby varying an inductance of the sensing side coil; and a fixed short ring, which is spaced apart at a predetermined distance from the referencing side coil of the arc portion of the referencing side portion, the fixed short ring correcting variations in the inductance of the sensing side coil due to the movement of the movable short ring, wherein the inductance of the sensing side coil is compared with an inductance of the referencing side coil, thereby detecting the rotational position of the rotational position-detected member.

Furthermore, the core is formed of: a core intermediate portion, which is formed by a plurality of laminated thin plates; and, core opposite end portions, which are disposed in a thickness direction in a sealed state on the top and bottom surfaces of the core intermediate portion, each of the core opposite end portions being thicker than each of the laminated thin plates. In addition, the core intermediate portion and the core opposite end portions are tightly secured together at given spots.

The core also can be made of sintered ferrite.

In addition, the following elements are sheathed with a resin material; different winding portions of the referencing side coil and the sensing side coil; terminals, which are disposed at different positions abutting the referencing side coil and the sensing side coil; connected portions, at which end portions of different winding portions of both of the above coils are connected to the terminals; and, crossover portions, which are spanned between the different winding portions of the above coils and the connected portions.

Furthermore, the rotational position sensor is provided with a fixed position-adjusting means for adjusting a fixed position of the fixed short ring in relation to the referencing side coil within fine limits.

The rotational position sensor is further provided with: a mounting plate, to which the core is fixedly mounted for fixed arrangement thereof; and, a combined position-adjusting means for adjusting a combined position of the core in relation to the rotational position-detected member in a circumferential direction thereof within fine limits.

In the rotational position sensor with the above structure, the inductance of the sensing side coil varies according to a shifting position of the movable short ring that turns jointly with a revolving shaft of a motor. The inductance of the sensing side coil is then compared with that of the correcting side coil, thereby correcting variations in output values influenced by temperature and the like. As a result, the rotational position is thereby detected.

The center of a ring portion of the core, in which the correcting side coil lies, is spaced apart at a predetermined distance from a rotation axis of the movable short ring (which is a rotation axis of the rotational position-detected member, namely, the center of a ring portion of the core in which the sensing side coil lies). The core is thereby formed into a substantial C-shape as a whole. Consequently, a shiftable range of the movable short ring is not limited by spaces for screws and the like to be incorporated therein for anchoring the fixed short ring to the core or for securing the core itself. This can insure that the movable short ring is possible to move over a wider range. As a result, the rotational position can be detected over a wider range (or, a wider angle range), and a detectable scope of the rotational position sensor is extended accordingly.

According to the present invention, the core comprises: a core intermediate portion, which is formed by a plurality of laminated thin plates; and, core opposite end portions, which are longitudinally disposed in a sealed state on the top and bottom surfaces of the core intermediate portion, each of the core opposite end portions being thicker than each of the laminated thin plates. Accordingly, the core opposite end portions prevent core deformation or detachment, which are likely to occur when the core is formed by the only laminated thin plates. In addition, the core intermediate portion thus formed by the laminated thin plates reduces loss due to an eddy current that occurs in rotating members and the like.

As can be seen from the above description, in the rotational position sensor according to the present invention, the core is formed of the core intermediate portion and the core opposite end portions. Therefore, the core is prevented from being deformed or detached, with reliability increased.

Furthermore, according to the present invention, the core intermediate portion and the core opposite end portions are tightly secured together at not less than two points radially opposite one another by means of fixing means. The above-mentioned benefits are thereby much more secured.

As previously described, the core can be formed integrally when made of sintered ferrite. This eliminates inconveniences such as deformation or detachment of the thin plates as well as a process in which more than one thin plate is laminated. In addition, ferrite itself possesses a property in which an eddy-current loss due to a high frequency is reduced in a magnetic field. Increased sensing accuracy of the rotational position sensor is thereby achievable.

In the rotational position sensor with the above-mentioned structure, each of the sensing side coil and the correcting side coil is integrally formed by the insertion of the following elements sheathed with a resin material: different winding portions of both of the above coils; terminals; connected portions, at which the different winding portions are connected to the terminals; and, crossover portions, which are spanned between the different winding portions and the connected portions. The above windings are thereby prevented from breaking because of vibrations or variations in ambient temperature, whereby reliability and durability are increased.

Furthermore, according to the present invention, a fixed position of a fixed member, i.e., the fixed short ring in relation to the referencing side coil is adjusted within fine limits using the fixed position-adjusting means. A length of the referencing side magnetic path in the core can thereby be adjusted within fine limits. As a result, in characteristics of the rotational position sensor, a variation ratio of an output voltage to the rotational position can be adjusted within fine limits. The increased sensing accuracy of the rotational position sensor is thereby achievable.

In addition, according to the present invention, a combined position of the core in relation to the rotational position-detected member in a circumferential direction thereof is adjusted within fine limits by the combined position-adjusting means. An initial position of a pivoting member (i.e. movable short circuiting) is thus adjusted within fine limits. As a result, in the characteristics of the rotational position sensor, an initial value for the output voltage at the same rotational position can be adjusted within fine limits. The increased sensing accuracy of the rotational position sensor is thereby achievable.

BRIEF DESCRIPTION OF THE DRAWINGS

FIG. 22 shows a core of the rotational position sensor of FIG. 20; specifically, FIG. 24 shows a modification of the core of FIG. 22; specifically.

DESCRIPTION OF THE PREFERRED EMBODIMENTS

A rotational position sensor 10 according to a first embodiment of the present invention will now be described with reference to FIG. 1 through FIG. 12.

Figure 3:
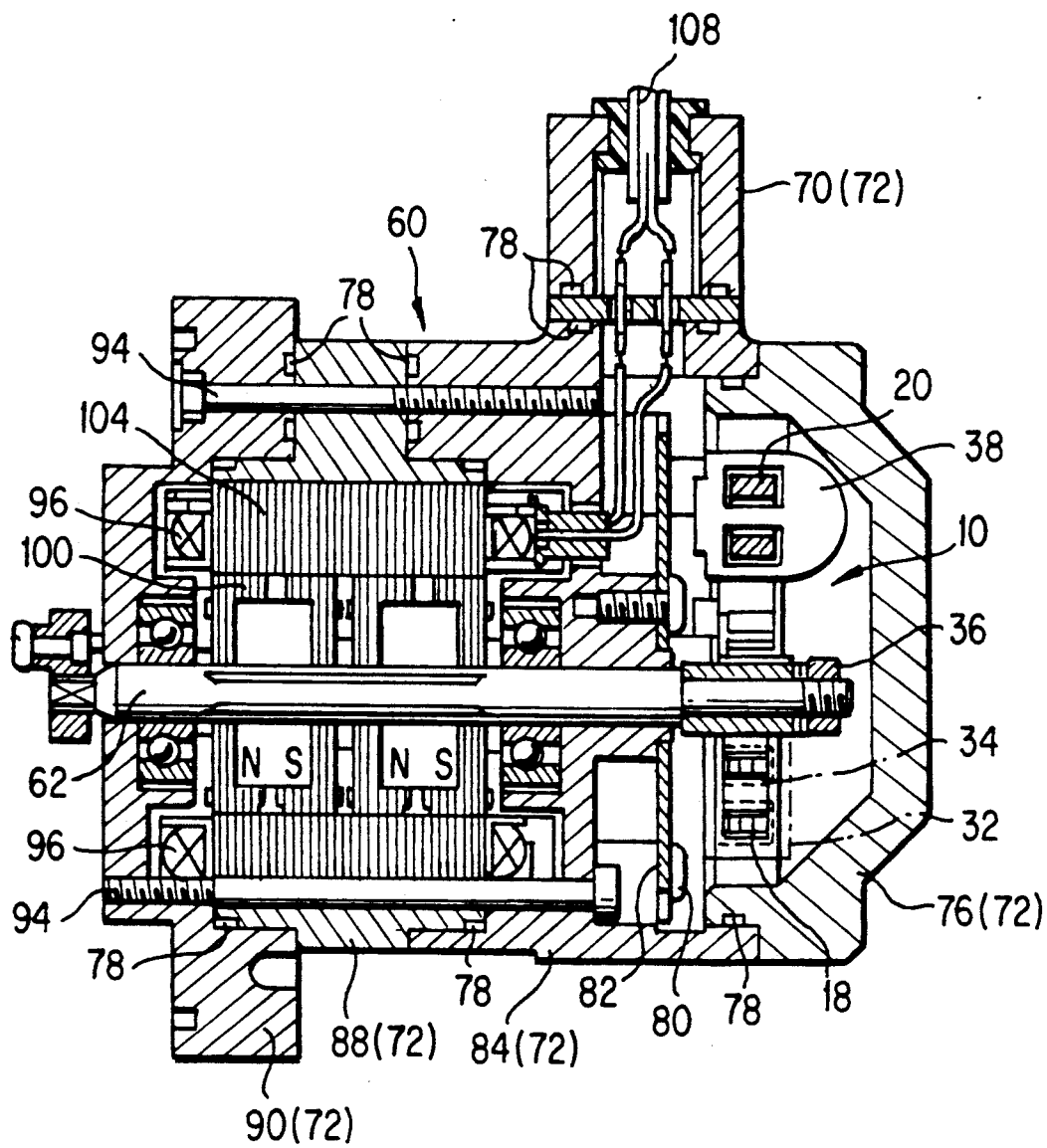
FIG. 3 is a general cross-sectional view showing a motor used by the rotational position sensor.

FIG. 3 is a cross-sectional view, illustrating a motor 60 into which the rotational position sensor 10 is mounted.

The motor 60 is formed with a housing 72 which consists of a lower housing 90, a lower-middle housing 88, an upper-middle housing 84, an upper housing 76, and a side housing 70. Function components, such as the rotational position sensor 10 and the like—of which details can be found hereinafter in the appropriate description—are accommodated inside the housing 72. An O-ring 78 is fitted and sealed in each contact surface between the above sub-housings 70, 76, 84, 88, and 90 of the housing 72. The sub-housings 70, 76, 84, 88, and 90 of the housing 72 are joined together at appropriate points thereof by a joining means such as bolts 94 or welds.

The lower-middle housing 88 has a cylindrical shape. A motor core 104 is disposed within the lower-middle housing 88 at the outer periphery side. A rotor 100 is rotatably disposed within the motor core 104. At one portion of the motor core 104, a coil 96 is wound in the circumferential direction. The coil 96 conducts electricity through a harness 108 that is accommodated within the side housing 70. When the coil 96 conducts electricity, the motor core 104 excites magnetism, thereby turning the rotor 100. A return spring (not shown) is interlocked with the rotor 100, thereby turning the rotor 100 to the point where an urging force of the return spring is balanced with a magnetic force generated in the motor core 104. A pivoting shaft 62, a rotational position-detected member, is disposed through a shaft core portion of the rotor 100. The pivoting shaft 62 is carried by ball bearings at an axially end portion and an axially middle portion thereof so as to turn jointly with the rotor 100.

Figure 1:
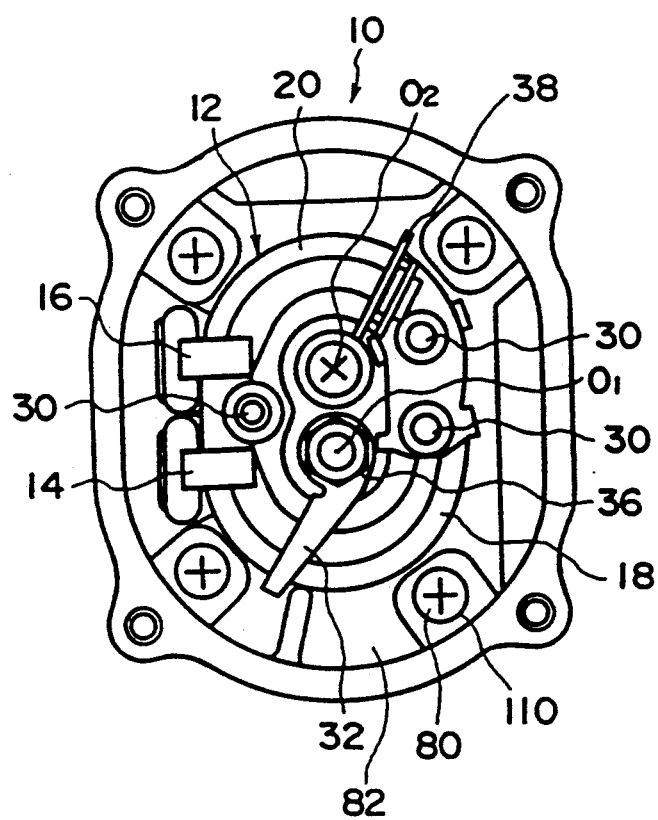
FIG. 1 is a front view showing a rotational position sensor according to the present invention.

The rotational position sensor 10 is disposed between the upper-middle housing 84 and the upper housing 76. As shown in FIG. 1, the rotational position sensor 10 is provided with a mounting plate 82 of a substantially elliptical shape. At each corner of the mounting plate 82, a tapped hole 110 (see FIG. 1) is formed as an elongated bore, so that the mounting plate 82 is combined with the upper-middle housing 84 by means of screws 80. (See FIG. 1.) In addition, the mounting plate 82 has three supporting portions (not shown) which are provided uprightly thereon. The supporting portion is a rounded or semi-rounded column. A core 12 is laid on the supporting portions, and as such the core 12 is combined with the mounting plate 82 by machine screws 30.

Figure 2A:
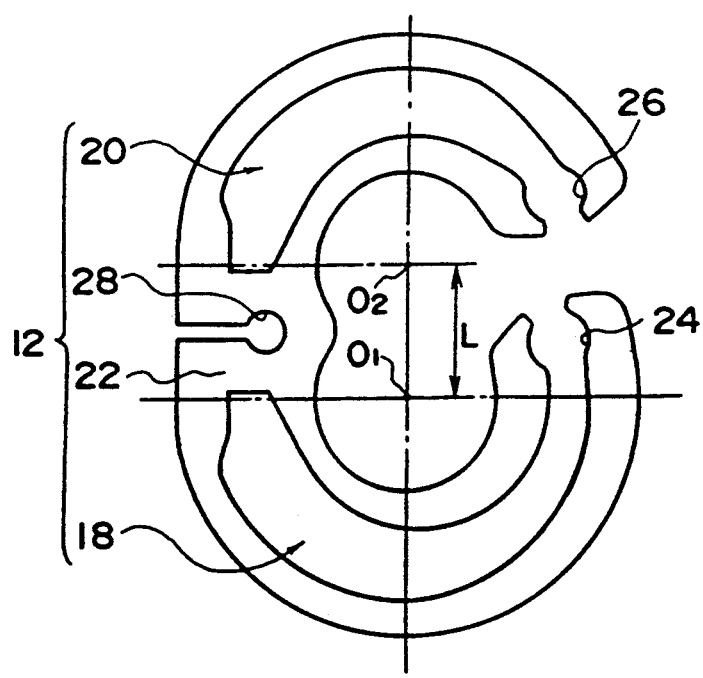
FIG. 2A is a plan view showing a core of the rotational position sensor.
Figure 2B:
FIG. 2B is a side view illustrating the core of the rotational position sensor.

As shown in FIG. 1, FIG. 2A, and FIG. 2B, the core 12 is formed of: a sensing portion 18, which serves as a sensing side portion; and, a correcting portion 20, which serves as a referencing side portion. As best seen from the top of the core 12 in FIG. 2A, the sensing portion 18 is divided into an internal portion and an external portion of one side of the core 12, both of which form concentric rings. Similarly, the correcting portion 20 is divided into an internal portion and an external portion of another side of the core 12, both of which form concentric rings. Both root end portions of the sensing portion 18 and the correcting portion 20 are integrally combined into a mounting root portion 22. At the other end portions of both of the sensing portion 18 and the correcting portion 20 of the core 12, mounting holes 24 and 26 are formed to allow the above-noted machine screws 30 to extend therethrough. Similarly, a mounting hole 28 is formed in the mounting root portion 22.

$O_1$ is the center of a ring portion that forms the sensing portion 18 of the core 12. $O_2$ is the center of a ring portion that forms the correcting portion 20 of the core 12. These $O_1$ and $O_2$ are positioned away from each other at predetermined distance L, whereby the core 12 is formed into a substantial C-shape as a whole. This increases a degree of fit of the core 12 for formation and extends a pivoting range, i.e., a detectable range of a movable short ring 32, of which details can be found hereinafter in the appropriate description. The core 12 is positioned in such a way that $O_1$, the center of the ring portion of the sensing portion 18, is in alignment with an axis of the pivoting shaft 62 of the motor 60. A rotation axis of the movable short ring 32—of which details will be given afterward—is thereby aligned with $O_1$, the center of the ring portion of the sensing portion 18.

FIG. 2B shows a side view of the core 12. The core 12 is formed by thin plates such as a silicic steel plate or a permalloy, which are laminated to form an iron (magnetic) core. As shown in FIG. 1, a sensing side coil 14 extends around the root end portion (or, the side of the mounting root portion 22) of the sensing portion 18 of the core 12. A correcting side coil 16 extends around the root end portion of the correcting portion 20 so as to act as a referencing side coil. The sensing side coil 14 and the correcting side coil 16 are designed to conduct electricity. When an alternating current is conducted, an alternating-current magnetic field occurs in the sensing portion 18 and the correcting portion 20 of the core 12.

The movable short ring 32 is disposed on the outer periphery of the sensing portion 18 of the core 12 so as to act as a pivoting member. The movable short ring 32 is formed of a conductive material such as copper and with a pair of rectangular through holes 34 to accommodate the sensing portion 18 of the core 12. The sensing portion 18 extends through the above holes 34 to permit the movable short ring 32 to make a circular movement in relation to the sensing portion 18. As a result, the movable short ring 32 has induced therein an eddy current which is caused by the resulting alternating-current magnetic field in the sensing portion 18. One end portion of the movable short ring 32 is anchored to the pivoting shaft 62 of the motor 60 by means of a stop screw 36. Consequently, the movable short ring 32 always turns jointly with the pivoting shaft 62 of the motor 60. The movable short ring 32 also makes a circular movement in relation to and across the sensing portion 18 of the core 12. As a result, an interrupted position of a magnetic flux, which is established in the sensing side coil 14, varies with a shift in the position of the movable short ring 32, thereby causing a shorter or a longer magnetic path and a varying inductance of the sensing side coil 14.

Meanwhile, a fixed short ring 38 that is formed of a conductive material such as copper is disposed at the outer periphery of the correcting portion 20 of the core 12. By means of the above-noted mounting holes 24 and 26 and the machine screws 30, the fixed short ring 38 is fixed to the correcting portion 20 in place (this location corresponds, for example, to half a range at which the movable short ring 32 can move). In conjunction with the correcting side coil 16, the fixed short ring 38 serves to correct variations in the inductance of the sensing side coil 14 which are influenced by temperature and the like. The inductance of the sensing side coil 14 is then compared with that of the correcting side coil 16, thereby allowing the rotational position of the pivoting shaft 62 of the motor 60 to be detected on the basis of the resulting inductance value.

As is the case with the above-described movable short ring 32, the alternating-current magnetic field occurs in the correcting portion 20 of the core 12 when the correcting side coil 16 conducts the alternating current. The eddy current is thereby set up in the fixed short ring 38. As a result, a magnetic path is established to determine an inductance value of the correcting side coil 16. However, the inductance value of the correcting side coil 16 varies when ambient temperature fluctuates. In addition, the inductance of the sensing side coil 14 varies with such fluctuation. Accordingly, comparing the inductances between these two coils 14 and 16 can correct variations in the inductance of the sensing side coil 14 due to the fluctuation in ambient temperature. As a result, only the rotational position of the pivoting shaft 62 of the motor 60 is detected within fine limits.

Figure 4:
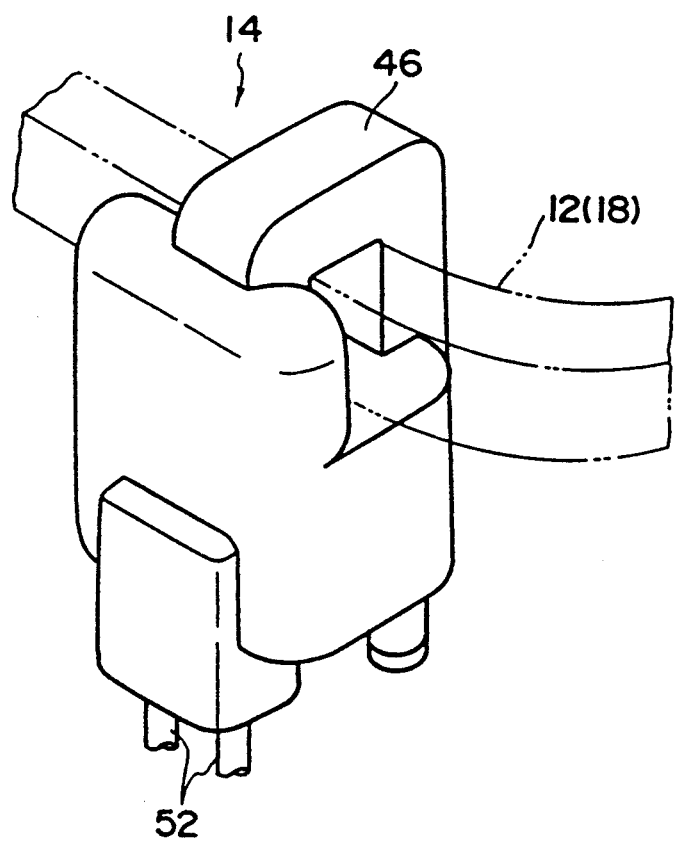
FIG. 4 is a perspective view illustrating a sensing side coil of the rotational position sensor.
Figure 5:
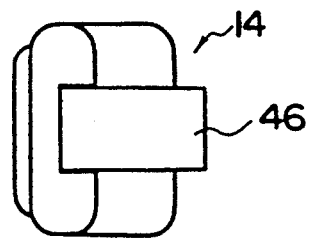
FIG. 5 is a plan view of the sensing side coil.
Figure 6:
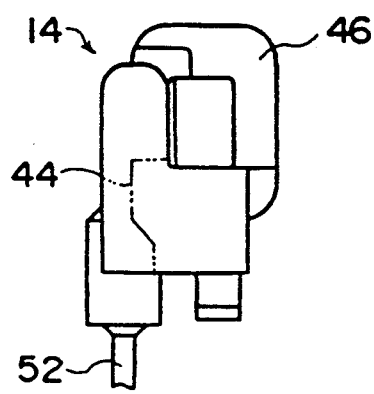
FIG. 6 is a side view of the sensing side coil.
Figure 7:
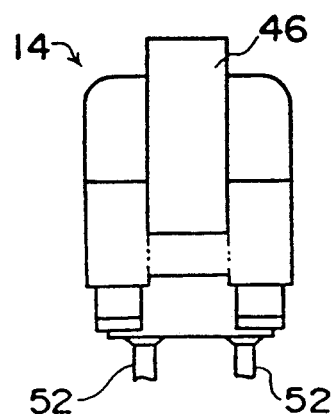
FIG. 7 is a front view of the sensing side coil.
Figure 8:
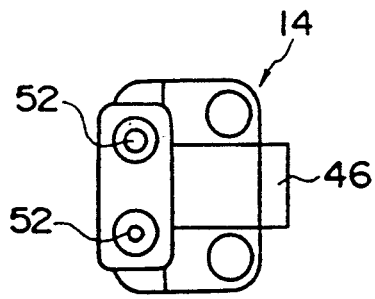
FIG. 8 is a back view of the sensing side coil.
Figure 9:
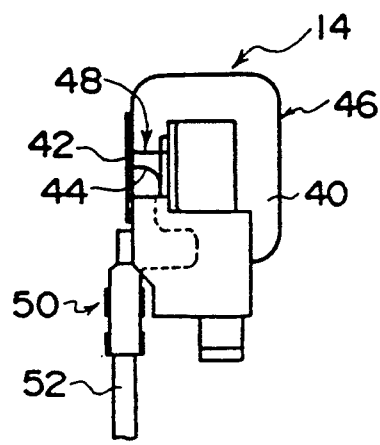
FIG. 9 is a side view illustrating an inner structure of the sensing side coil prior to unitary resin formation.
Figure 10:
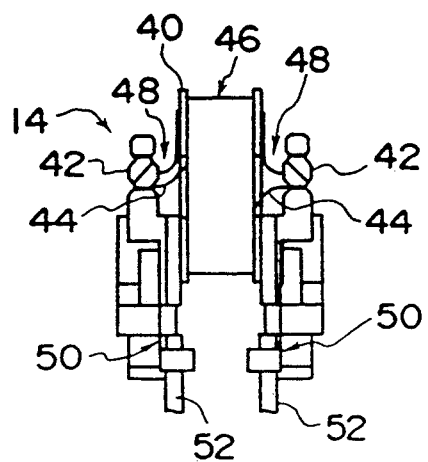
FIG. 10 is a front view illustrating the inner structure of the sensing side coil prior to the unitary resin formation.
Figure 11:
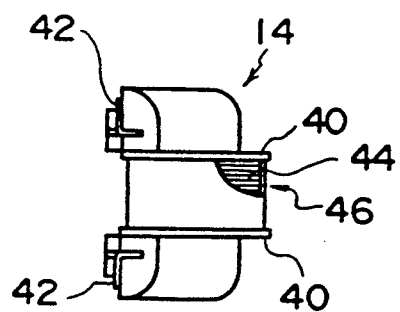
FIG. 11 is a plan view illustrating the inner structure of the sensing side coil prior to the unitary resin formation.
Figure 12:
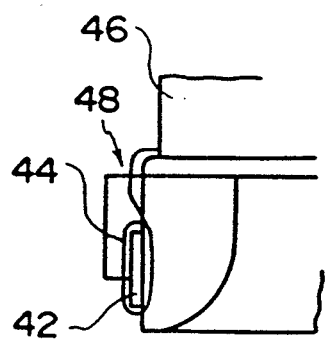
FIG. 12 is an enlarged top view showing a particular portion of a terminal of the sensing side coil of FIG. 11.
Figure 13:
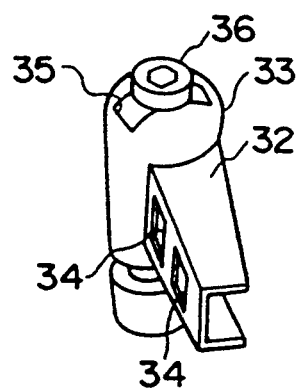
FIG. 13 is a perspective view showing a normally fixed state of a movable short ring according to a modification of a first embodiment.
Figure 14:
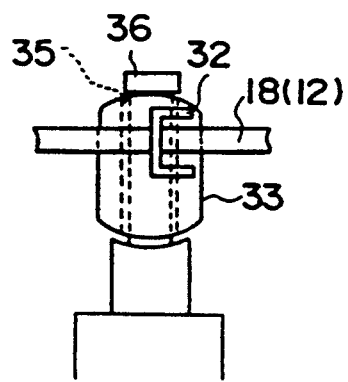
FIG. 14 is a front view illustrating a normally fixed state of the movable short ring according to the modification of the first embodiment.
Figure 15:
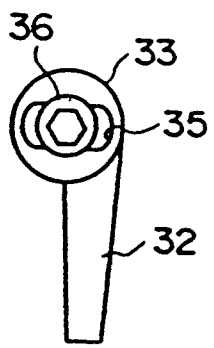
FIG. 15 is a plan view illustrating a normally fixed state of the movable short ring according to the modification of the first embodiment.

The above-described sensing side coil 14 and the correcting side coil 16 are based on the same structure. FIG. 4 is a perspective view showing the sensing side coil 14. FIG. 5 through FIG. 8 are a plan view, a side view, a front view, and a back view respectively, which all show the sensing side coil 14. FIG. 9 through FIG. 11 illustrate each different aspect of an inner structure of the sensing side coil 14. FIG. 12 is an enlarged view of a particular portion of the inner structure.

FIG. 10 illustrates a structure of the sensing side coil 14 (which corresponds to that of the correcting side coil 16), in which terminals 42 are mounted to opposite sides of a bobbin 40. One end portion of a winding 44 is connected to one terminal 42 by way of spot welding, and the winding 44 is then coiled around the outermost circumference of the bobbin 40 so as to form a coiled portion 46. The other end portion of the winding 44 is connected to the other terminal 42 by way of spot welding. As best seen from FIG. 12, at each connected portion of the terminals 42, the winding 44 is connected so as to deflect, thereby forming a crossover portion 48. At each lower end portion of the terminals 42, a caulking portion 50 is provided, to which a lead wire 52 is connected.

Operations of the present embodiment will now be described.

In a rotational position sensor 10 with the above structure, the inductance of the sensing side coil 14 varies according to a shifting position of the movable short ring 32 that turns jointly with the pivoting shaft 62 of the motor 60. The inductance of the sensing side coil 14 is then compared with that of the correcting side coil 16, thereby correcting variations in output values influenced by temperature and the like. As a result, the rotational position is detected.

$O_2$ is the center of the core 12 corresponding to the correcting side coil 16, or rather the center of the ring portion of the correcting portion 20 of the core 12. This $O_2$ is shifted at predetermined distance L so as to be spaced apart from the rotation axis of the movable short ring 32 (which is a rotation axis of the pivoting shaft 62 of the motor 60, namely, $O_1$, which is the center of the core 12 corresponding to the sensing side coil 14, or rather the center of the ring portion of the sensing portion 18 of the core 12). The core 12 is thereby formed into a substantial C-shape. Consequently, a movable range of the movable short ring 32 is not limited by spaces for the machine screws 30 to be incorporated therein so as to anchor the fixed short ring 38 onto the core 12 or so as to fix the core 12 itself. This can insure that the movable short ring 32 is possible to move over a wider range. As a result, the rotational position of the pivoting shaft 62 of the motor 60 can be detected over a wider range (or a wider angle range), and a detectable scope of the rotational position sensor 10 is extended accordingly.

In the present embodiment, in order that the movable short ring 32 is disposed to move its position in relation to the sensing portion 18 of the core 12, the movable short ring 32 is fixed to the pivoting shaft 62 of the motor 60 by means of the stop screw 36. However, this embodiment is not limited thereto. The movable short ring 32 may be designed to allow a fixed position thereof to be changed in relation to the pivoting shaft 62. To be specific, as shown in FIG. 13 through FIG. 18, in a root portion 33 of the movable short ring 32, an elongated hole 35 may be formed to permit the fixed position of the movable short ring 32 to be changed, whereby an inclination angle of the movable short ring 32 in relation to the core 12 (or rather the sensing portion 18) is alterable. The rotational position can thereby be detected with a higher degree of accuracy.

Figure 19:
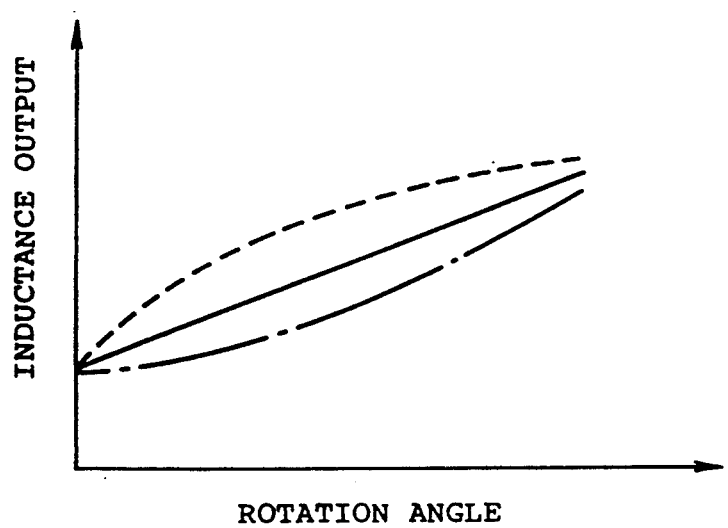
FIG. 19 is a diagrammatic view indicating variation characteristics of an inductance of the movable short ring in relation to a rotation angle thereof according to the modification of the first embodiment.

When the movable short ring 32 is fixed by the stop screw 36, a variation in the inductance of the sensing side coil 14 is not proportional to each angular shift of the movable short ring 32 in relation to the core 12 affected by: iron loss from the core 12; an eddy-current loss from the movable short ring 32; or, mutual inductances from the sensing side coil 14 and the correcting side coil 16. As a result, non-linear variation occurs, as shown by a dashed line and a one-dot chain line in FIG. 19. In order to cause the inductance of the sensing side coil 14 to vary linearly, a shape of the core 12 or raw materials of the core 12 must be changed or replaced with a repeated trial and error procedure.

Figure 16:
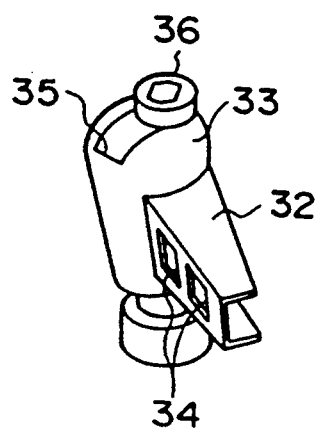
FIG. 16 is a perspective view illustrating a fixed state of an inclined movable short ring according to the modification of the first embodiment.
Figure 17:
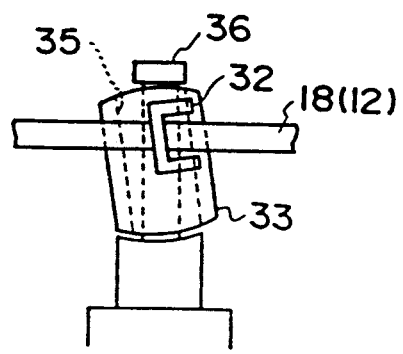
FIG. 17 is a front view illustrating a fixed state of the inclined movable short ring according to the modification of the first embodiment.
Figure 18:
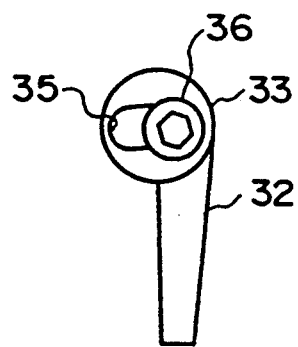
FIG. 18 is a plan view showing a fixed state of the inclined movable short ring according to the modification of the first embodiment.

Meanwhile, as previously described, when the root portion 33 of the movable short ring 32 is formed with the elongated hole 35 to allow the fixed position thereof to be changed, the inclination angle of the movable short ring 32 relative to the core 12 (or rather the sensing portion 18) is alterable, as illustrated in FIG. 16 through FIG. 18. Consequently, variation characteristics of the inductance can readily be controlled, thereby allowing the inductance of the sensing side coil 14 to vary proportionally to the angular shift of the movable short ring 32 in relation to the core 12. As shown by a solid line in FIG. 19, the induction of the sensing side coil 14 can thereby be established to linearly vary, whereby the rotational position is detected with more increased accuracy.

In the sensing side coil 14 and the correcting side coil 16 which both have the above-described inner structure, the following portions sheathed with an epoxy resin are formed into a one body configuration: the coiled portion 46; the connected portions at which the opposite end portions of the winding 44 are connected to the terminals 42; the crossover portions 48; and, the caulking portions 50. These portions are thereby constructed to avoid extending outside the above coils 14 and 16. The winding 44 is thereby prevented from breaking because of vibrations, jarring in the course of assembling work, or variations in ambient temperature. Therefore, both reliability and durability of the winding 44 are increased. Furthermore, nonuniformity in a production process can be reduced to a greater degree, and the resulting quality is stabilized, as compared with conventional manners in which an impregnant is applied to the winding 44 before the winding 44 is coiled up.

A second embodiment of the present invention will now be described. The same reference numbers are hereinafter given for members common to those described in the first embodiment; therefore, descriptions related thereto will be omitted.

A rotational position sensor 210 according to the present embodiment is incorporated into the housing 72 in the same manner as the rotational position sensor 10 of the first embodiment.

As illustrated in FIG. 20, FIG. 21, FIG. 22A, and FIG. 22B, a core 112 is formed of: a sensing portion 118, which serves as a sensing side portion; and, a correcting portion 120, which serves as a referencing side portion. As best seen from the top of the core 112 in FIG. 22A, the sensing portion 118 is divided into an internal portion and an external portion of one side of the core 112, both of which form concentric rings. Similarly, the correcting portion 120 is divided into an internal portion and an external portion of another side of the core 112, both of which form concentric rings. Both root end portions of the sensing portion 118 and the correcting portion 120 are integrally combined into a mounting root portion 164. At the other end portions of both of the sensing portion 118 and the correcting portion 120 of the core 112, mounting holes 128 are formed to allow machine screws 130 to extend therethrough. Similarly, a mounting hole 128 is formed in the mounting root portion 164.

$O_1$ is the center of a ring portion that forms the sensing portion 118 of the core 112. $O_2$ is the center of a ring portion that forms the correcting portion 120 of the core 112. $O_1$ and $O_2$ are positioned away from each other at predetermined distance L, whereby the core 112 is formed into a substantial C-shape as a whole. This increases the degree of fit of the core 112 for formation, and extends a turnable range, i.e., detectable range of a movable short ring 132, of which details can be found hereinafter in the appropriate description. The core 112 is positioned in such a way that $O_1$, the center of the ring portion of the sensing portion 118, is in alignment with the axis of the pivoting shaft 62 of the motor 60. A rotation axis of the movable short ring 132—of which details will be given afterward—is thereby aligned with $O_1$, the center of the ring portion of the sensing portion 118.

Figure 20:
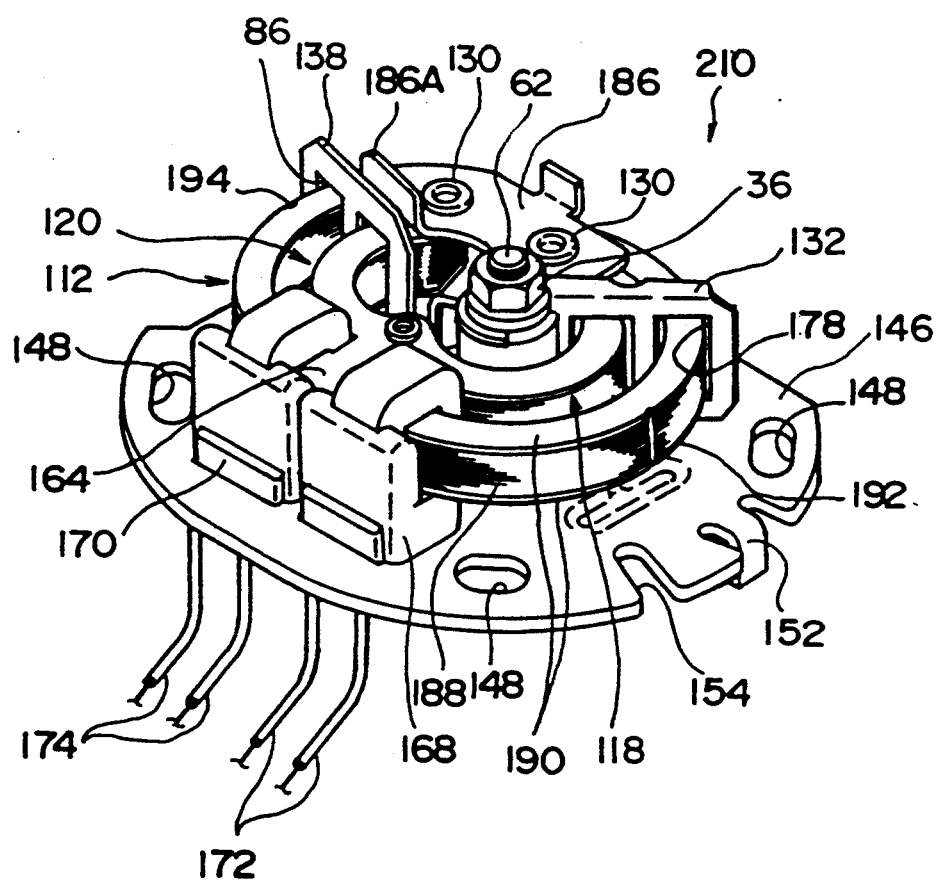
FIG. 20 is a perspective view showing a rotational position sensor according to a second embodiment of the present invention.
Figure 21:
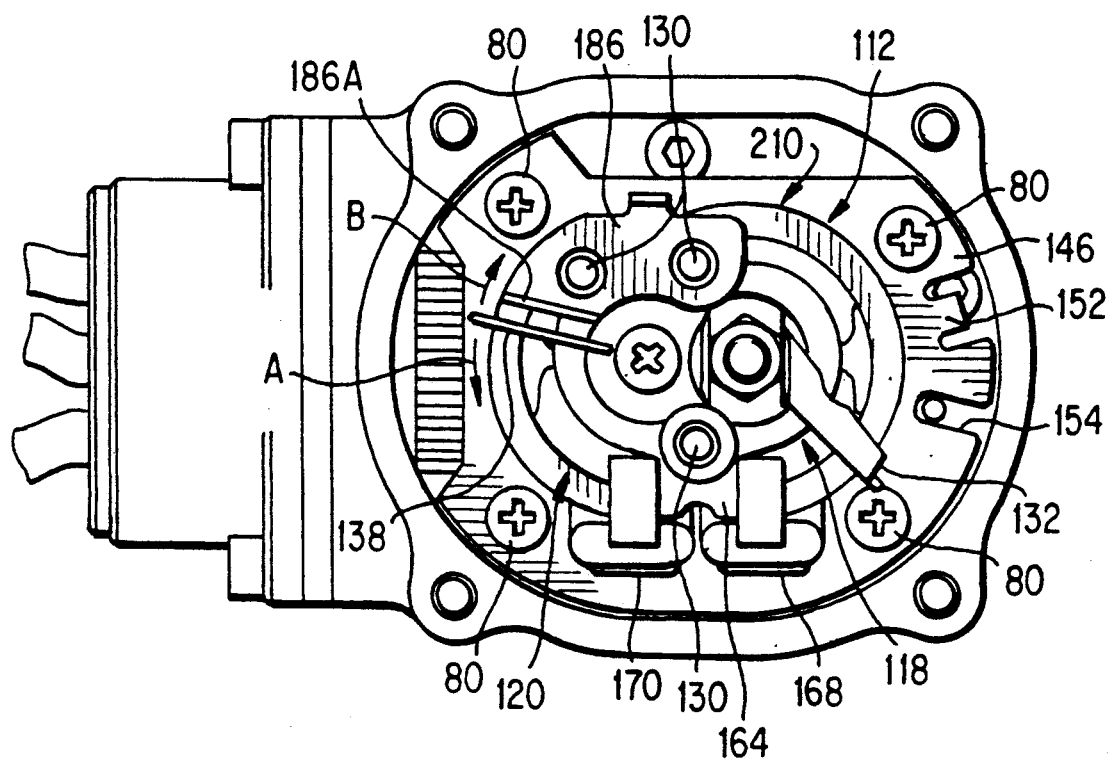
FIG. 21 is a plan view illustrating a motor in which the rotational position sensor of FIG. 20 is mounted without an upper housing.

As shown in FIG. 20 and FIG. 21, a sensing side coil 168 sheathed with a resin extends around the root end portion (or the side of the mounting root portion 164) of the sensing portion 118 of the core 112. Similarly, a correcting side coil 170 sheathed with the resin extends around the root end portion of the correcting portion 120 so as to act as a referencing side coil. The sensing side coil 168 and the correcting side coil 170 are designed to conduct electricity through lead wires 172 and 174. (See FIG. 20.) When an alternating current is conducted, an alternating-current magnetic field occurs in the sensing portion 118 and the correcting portion 120 of the core 112.

The movable short ring 132 is disposed on the outer periphery of the sensing portion 118 of the core 112 so as to act as a pivoting member. The movable short ring 132 is formed with a pair of rectangular through holes 178 to accommodate the sensing portion 118 of the core 112. The sensing portion 118 extends through the above through holes 178 to permit the movable short ring 132 to make a circular movement in relation to the sensing portion 118. As a result, the movable short ring 132 has induced therein an eddy current which is caused by the resulting alternating-current magnetic field in the sensing portion 118. One end portion of the movable short ring 132 is anchored to the pivoting shaft 62 of the motor 60 by means of the stop screw 36. Consequently, the movable short ring 132 always turns jointly with the pivoting shaft 62 of the motor 60. The movable short ring 132 also makes a circular movement in relation to and across the sensing portion 118 of the core 112. As a result, an interrupted position of a magnetic flux, which is generated in the sensing side coil 168, varies with a shift in the position of the movable short ring 132, thereby causing a shorter or a longer magnetic path and a varying inductance of the sensing side coil 168.

A fixed short ring 138 is disposed on the outer periphery of the correcting portion 120 of the core 112 so as to act as a fixed member. By means of the above-noted mounting holes 128 and the machine screws 130, the fixed short ring 138 is fixed to the correcting portion 120 in place (this location corresponds, for example, to half a range at which the movable short ring 132 can move). To be specific, the fixed short ring 138 consists of: a pair of through holes 86, through which the correcting portion 120 of the core 112 extends; and, extending portions (not shown), which are bent from lower end portions of the pair of through holes 86 and are then extended in the circumferential direction of the core 112. Both end portions of the sensing portion 118 and the correcting portion 120 of the core 112 are held together without surface irregularities, i.e., without movement by means of the above extending portions and a flange 186 that is disposed so as to span between the sensing portion 118 and the correcting portion 120 of the core 112. As such the above-noted end portions of the sensing portion 118 and the correcting portion 120 are anchored together to a mounting plate 146 by means of the aforesaid machine screws 130. At the side of the fixed short ring 138, an end portion of the flange 186 stands upright in a plane parallel with the fixed short ring 138. The end portion of the flange 186, namely, an upright end portion 186A acts as a fixed position-adjusting means. The upright end portion 186A is used for fine inclination adjustment, of which details will be given in the appropriate description.

As is the case with the above-described movable short ring 132, the alternating-current magnetic field occurs in the correcting portion 120 of the core 112 when the correcting side coil 170 conducts the alternating current. The eddy current is thereby set up in the fixed short ring 138. As a result, a magnetic path is established to determine an inductance value of the correcting side coil 170. However, the inductance value of the correcting side coil 170 varies when ambient temperature fluctuates. In addition, the inductance of the sensing side coil 168 varies with such fluctuation. Accordingly, comparing the inductance between these two coils 170 and 168 can correct variations in the inductance of the sensing side coil 168 due to the fluctuation in ambient temperature. As a result, only the rotational position of the pivoting shaft 62 of the motor 60 is detected within fine limits.

The mounting plate 146 is formed with a claw 152 and a U-shaped notch 154. The claw 152 is cut upwardly so as to effect positioning in relation to the upper-middle housing 84. The notch 154 is used as a combined position-adjusting means for zero point fine adjustment.

Figure 22A:
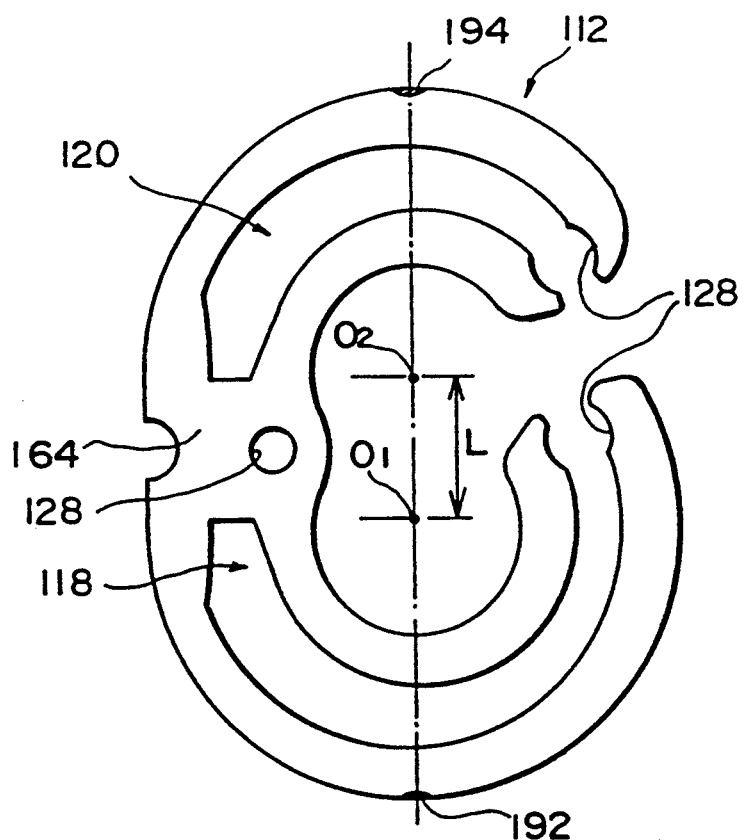
FIG. 22A and FIG. 22B are a top view and a side view respectively illustrating the core.
Figure 22B:
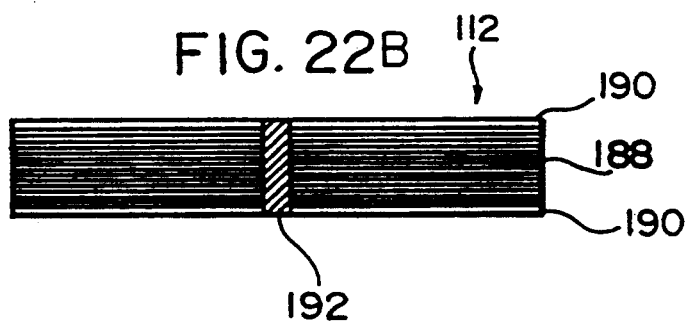

As shown in FIG. 22B, the above-described core 112 is formed of: a core intermediate portion 188, which has laminated thin plates; and, core opposite end portions 190, each of which is thicker than a thin plate. On the top and the bottom of the core intermediate portion 188, the core opposite end portions 190 are disposed in a sealed state so as to hold the core intermediate portion 188 therebetween. The core intermediate portion 188 and the core opposite end portions 190 are welded at only two welds 192 and 194. A weld 192 is located at a central portion of the outermost circumference of the sensing portion 118 of the core 112, while a weld 194 is located at a central portion of the outermost circumference of the correcting portion 120 of the core 112. The core intermediate portion 188 and the core opposite end portions 190 are thereby combined into a one-piece body. Each depth of penetration is formed at the welds 192 and 194 by a small amount.

Operations of the present embodiment will now be described with reference to both the assembly of the rotational position sensor 210 itself and the combining of the rotational position sensor 210 with the upper-middle housing 84.

As a first step, the core 112 itself is built for the rotational position sensor 210. To be specific, the thin plates, which form the core intermediate portion 188, and thick plates, which form the core opposite end portions 190, are separately press-machined. A predetermined number of the thin plates are then laminated to allow the respective thick plates to be disposed in a sealed state on the opposite surfaces of the laminated thin plates. Welding is effected at both of the welds 192 and 194 on the respective outermost circumferences of the sensing portion 118 and the correcting portion 120, thereby combining the core intermediate portion 188 with the core opposite end portions 190 so as to form a one-piece body. When welding, the depth of the weld should be small so as to eliminate adverse effects on the magnetic field in the core 112 when the rotational position sensor 210 is in use.

The core 112 with such a monolithic structure is then fitted temporarily with: the sensing side coil 168; the correcting side coil 170; the movable short ring 132; and, the fixed short ring 138. The core 112 is thereafter laid on supporting portions of rounded or semi-rounded columns, which are provided on the mounting plate 146. As such the core 112 is fixed thereto by machine screws 130, thereby forming the rotational position sensor 210 itself.

At the next stage, the rotational position sensor 210 is combined with the upper-middle housing 84. To be specific, the claw 152 of the rotational position sensor 210 is held in place against the upper-middle housing 84, thereby roughly positioning the rotational position sensor 210. At the same time, tapped holes 148 of the mounting plate 146 are in alignment with those holes formed in the upper-middle housing 84 which correspond to the above tapped holes 148. The movable short ring 132 is thereby anchored to the pivoting shaft 62. The rotational position sensor 210 is then secured temporarily to the upper-middle housing 84 by means of screws 80.

Figure 23:
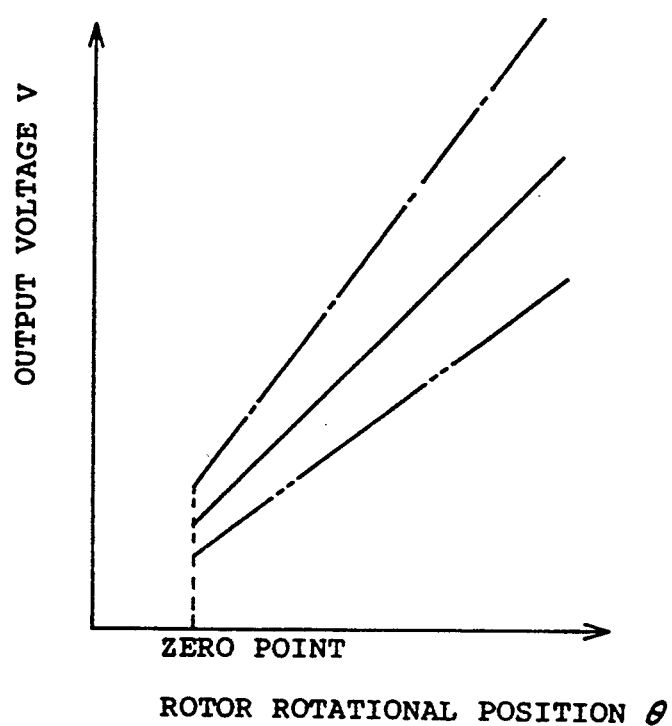
FIG. 23 is a graph illustrating a method of fine adjustment for the assembling of the rotational position sensor of FIG. 20.

The rotational position sensor 210 thus assembled is thereafter adjusted within fine limits. With reference to FIG. 23, a brief description will now be given of a method for fine adjustment. FIG. 23 is a graph illustrating characteristics of the rotational position sensor 210. In this graph, a lateral axis represents rotational position θ of a rotor 100 (or the movable short ring 132), while a longitudinal axis expresses output voltage V of the rotational position sensor 210. A solid line in the graph shows an ideal line.

When characteristics of the rotational position sensor 210 in an assembled state are out of line with the ideal line, both zero point adjustment and inclination adjustment must be achieved in order to match these characteristics with the ideal line. In order to achieve the zero point adjustment, a correcting means is inserted into the U-shaped notch 154 of the mounting plate 146 of the rotational position sensor 210 so as to slightly shift a combined position of the mounting plate 146 in relation to the housing 72. Consequently, a combined position of the core 112 in relation to the housing 72 is changed relatively, thereby altering an initial position (or starting position) of the movable short ring 132 in the sensing portion 118. As a result, a graphical zero point, i.e., an initial value of the output voltage at the same rotational position increases or decreases, thereby adjusting the graphical zero point within fine limits.

In order to achieve the inclination adjustment, in the rotational position sensor 210, the upright end portion 186A of the flange 186 and the fixed short ring 138 are forcibly pushed toward one another in such a way that the upright end portion 186A and the fixed short ring 138 are fastened together. The fixed short ring 138 is thereby slightly shifted to be close or away from the correcting side coil 170, which alters a predetermined value for a length of the magnetic path in the correcting portion 120. As a result, a graphical inclination is adjusted within fine limits (for example, with reference to a state indicated by the ideal line, the graphical inclination varies in a manner drawn by a one-dot chain line when the fixed short ring 138 is pushed in the direction of arrow A as indicated in FIG. 21, while varying in a manner drawn by a two-dot chain line when the same fixed short ring 138 is pushed in the direction of arrow B).

In this way, the rotational position sensor 210 is provided with: the upright end portion 186A, which is arranged to adjust the fixed position of the fixed short ring 138 within fine limits; and, the notch 154, which is adapted to adjust the combined position of the core 112 within fine limits. As a result, the rotational position sensor 210 can obtain increased accuracy of sensing when assembled. Furthermore, according to the above-mentioned arrangement, a combined state between the movable short ring 132 and the pivoting shaft 62 is adjusted within fine limits, thereby making associated operations easier than those of the zero point adjustment.

Next, the rotational position sensor 210 provides the following actions when ready for use.

When the rotor 100 turns at a predetermined angle, the movable short ring 132, which is connected to the pivoting shaft 62, turns in response thereto. Turning the movable short ring 132 alters the inductance of the sensing side coil 168. In addition, the respective inductance of the correcting side coil 170 and the sensing side coil 168 vary at a common level therebetween according to the fluctuation of ambient temperature. Accordingly, comparing the inductances of these two coils 170 and 168 can correct variations in the inductance of the sensing side coil 168 due to the fluctuation of ambient temperature. The only inductance variation caused by the turning of the revolving shaft 62 can thereby be extracted. On the basis of an inductance variation due to the turning of the movable short ring 132, which is derived from a step just mentioned, a rotational amount of the pivoting shaft 62 is determined and is then detected. In accordance with the resulting detection value, the rotor 100 is checked to examine if it turns and reaches a proper position.

The rotational position sensor 210 according to the present embodiment is formed of: the core intermediate portion 188, in which the laminated thin plates are constructed so as to constitute the core 112; and, the core opposite end portions 190, which are disposed in the sealed state on the top and bottom surfaces of the core intermediate portion 188. The core intermediate portion 188 and the core opposite end portions 190 are welded together at the welds 192 and 194. As a result, surfaces of the core 112 can be prevented from being deformed or detached, as compared with a core which is built of the laminated thin plates alone. The movable short ring 132 can thereby be prevented from coming into contact with a deformed or detached core, which increases the reliability of the rotational position sensor 210. A benefit of such increased reliability of the rotational position sensor 210 is also realized by the core intermediate portion 188 built of the laminated thin plates, in which a loss due to the eddy current is reduced.

The welds 192 and 194 between the core intermediate portion 188 and the core opposite end portions 190 are located at two spots radially opposite one another on the outermost circumference of the core 112. In addition, the depth of the welds 192 and 194 should be small so as to produce no adverse effects on the magnetic field that is established in the core 112. Furthermore, the core 112 can be formed integrally, thereby increasing the degree of fit of the core 112 for the formation of the rotational position sensor 210.

Figure 24A:
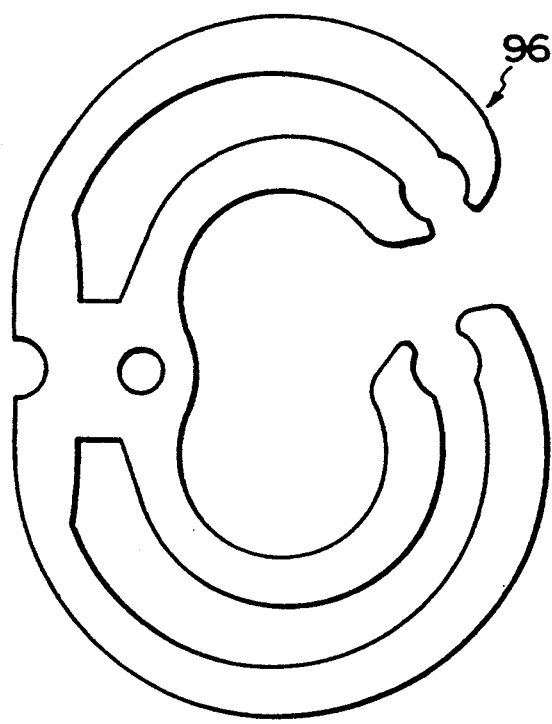
FIG. 24A and FIG. 24B are a top view and a side view respectively illustrating the core according to the modification.
Figure 24B:

In the present embodiment, the core 112, which is formed of the core intermediate portion 188 and the core opposite end portions 190, has been described by way of illustration. Meanwhile, as shown in FIG. 24A and 24B, a core 196 may be employed in view of prevention of core deformation or detachment. In order to prevent core deformation or detachment, materials used in the core 196 have been improved, unlike the above-described embodiment in which a core structure has been improved for the same purpose. To be specific, the core 196 is made of sintered ferrite. The core 196 can thus increase intrinsic resistance thereof and decrease loss due to the eddy current, thereby allowing sensing accuracy of the rotational position sensor 210 to increase. In addition, the core 196 is made of a single component, which eliminates a thin-plate lamination process. Therefore, core manufacturability can be improved. Furthermore, the sintered ferrite forming the core 196 can prevent the surfaces thereof from being deformed or detached, thereby achieving increased reliability of the rotational position sensor 210.

In the present embodiment, welding is used as a fixing means. In addition, this embodiment is not limited thereto, but is susceptible to the use of a resin-made clip and the like which is downsized to the point where the movable short ring 132 is not restricted from turning.

In the present embodiment, welding is effected at two welds 192 and 194. Furthermore, this embodiment is not limited thereto, but covers a range from three welds to an increased number of welds to the point which produces no adverse effects on the magnetic field established in the core 112. The welds 192 and 194 on the outermost circumference of the core 112 can also be located in the inner-circumference thereof.

In the present embodiment, the U-shaped notch 154 is employed as the combined position-adjusting means. Furthermore, this embodiment is not limited thereto, but covers the use of: a circular hole; a protuberance; or, whatever structure designed to allow the combined position of the core 112 (and that of the rotational position sensor 210) in relation to the upper housing 76 to be adjusted within fine limits.

In the present embodiment, the flange 186 has the upright end portion 186A, which serves as the fixed position-adjusting means; and, the upright end portion 186A and the fixed short ring 138 are fastened together, thereby adjusting the fixed short ring 138 within fine limits. In addition, this embodiment is not limited thereto, but is extended to an another fine adjustment structure in which: a screw is driven through the upright end portion 186A in a plane perpendicular to a surface of the upright end portion 186A; the screw is then disposed on the upright portion 186A in such a way that an end portion of the screw just contacts the fixed short ring 138; and, the fixed position of the fixed short ring 138 is adjusted within fine limits while the screw is pulled up or backed off.

The motor 60 fitted with the above-described rotational position sensor 10 or 210 is disposed within a fuel injection pump for a diesel engine so as to control fuel injection. Not limited to this type of motor, the rotational position sensors 10 and 210 can be used for all applications in which the rotational position of the rotational position-detected member must be detected with a high degree of precision.

What is claimed is:

1. A rotational position sensor of an inductance type for detecting a rotational position of a rotational position-detected member, comprising:
   a magnetic core having a substantial C-shape, which is disposed radially around a rotational position-detected member so as to be spaced apart from said rotational position-detected member, said magnetic core being provided with a referencing side portion for formation of a referencing side magnetic path and a sensing side portion for formation of a sensing side magnetic path, and said core having an arc portion for each of said referencing side portion and said sensing side portion, in which the center of said arc portion of said referencing side portion is spaced apart at a predetermined distance from the center of the arc portion of said sensing side portion in a direction in which both of said arc portions face one another in spaced relation,
   a referencing side coil formed by a lead wire being wound around said arc portion of said referencing side portion;
   a sensing side coil formed by a lead wire being wound around said arc portion of said sensing side portion;
   a movable conductive short ring connected to said rotational position-detected member so as to be in alignment therewith and being disposed to permit turning thereof relative to said arc portion of said sensing side portion, and said movable short ring shifting its position in relation to said arc portion of said sensing side portion according to the turning of said rotational position-detected member, thereby varying an inductance of said sensing side coil; and
   a fixed conductive short ring, which is spaced apart at a predetermined distance from said referencing side coil of said arc portion of said referencing side portion, said fixed short ring correcting variations in the inductance of said sensing side coil due to the movement of said movable short ring,
   wherein the inductance of said sensing side coil is compared with an inductance of said referencing side coil, to provide an indication of the rotational position of said rotational position-detected member.

2. A rotational position sensor according to claim 1, further comprising: terminals, which are disposed at respective positions abutting said referencing side coil and said sensing side coil; connected portions, at which end portions of respective winding portions of both of said coils are connected to said terminals; and, crossover portions, which are spanned between said respective winding portions of both of said coils and said connected portions,
   wherein said winding portions of both of said coils, said terminals, said connected portions, and said crossover portions are sheathed with a resin material.

3. A rotational position sensor according to claim 2, wherein said winding portions of said referencing side coil and said sensing side coil, said terminals, said connected portions, and said crossover portions are formed integrally of a resin material by insert molding.

4. A rotational position sensor according to claim 1, wherein said core has a core intermediate portion, which is formed by a plurality of laminated thin plates, and core opposite end portions, which are disposed in a sealed state on the top and bottom surfaces of said core intermediate portion, each of said core opposite end portions being thicker than each of said laminated thin plates.

5. A rotational position sensor according to claim 4, wherein said core intermediate portion and said core opposite end portions are rigidly secured together at given points.

6. A rotational position sensor according to claim 1, wherein said core is made of sintered ferrite.

7. A rotational position sensor according to claim 1, further comprising: a fixed position-adjusting means for adjusting a fixed position of said fixed short ring relative to said referencing side coil within fine limits.

8. A rotational position sensor according to claim 7, further comprising: a plate member to be spanned between the opposite end portions of said core, wherein said plate member has an upright end portion at the side of said referencing side portion, said upright end portion being spaced apart from said fixed short ring at a predetermined distance.

9. A rotational position sensor according to claim 7, wherein said fixed position-adjusting means is a screw that is screwed through said upright end portion of said plate member in a plane perpendicular thereto, thereby forcing an end portion of said screw into contact with said fixed short ring.

10. A rotational position sensor according to claim 1, further comprising: a mounting plate, to which said core is fixedly mounted for fixed arrangement thereof; and, a combined position-adjusting means for adjusting a combined position of said core, within fine limits, in a circumferential direction of said core in relation to said rotational position-detected member.

11. A rotational position sensor according to claim 10, wherein said combined position-adjusting means is a U-shaped notch formed in said mounting plate.

12. A rotational position sensor according to claim 10, wherein said combined position-adjusting means is one of a circular hole and a protuberance, both of which are formed in said mounting plate.

13. A rotational position sensor according to claim 1, wherein said movable short ring is designed to allow an inclination angle thereof in relation to said arc portion of said sensing side portion to be changed when shifting its position relative to said arc portion of said sensing side portion.

14. A rotational position sensor according to claim 13, wherein said movable short ring has an elongated hole formed as a connecting portion to which the movable short ring is connected to said rotational position-detected member.

15. A rotational position sensor of an inductance type for detecting the rotational position of a rotational position-detected member, comprising:

a magnetic core having a substantial C-shape, which is disposed radially around said rotational position-detected member so as to be spaced apart from said rotational position-detected member, said magnetic core being provided with a referencing side portion for formation of a referencing side magnetic path and a sensing side portion for formation of a sensing side magnetic path, and said magnetic core having an arc portion for each of said referencing side portion and said sensing side portion, a referencing side coil formed by a lead wire being wound around said arc portion of said referencing side portion;

a sensing side coil formed by a lead wire being wound around said arc portion of said sensing side portion;

terminals, which are disposed at respective positions abutting said referencing side coil and said sensing side coil; connected portions, at which end portions of respective winding portions of both of said coils are connected to said terminals; and, crossover portions, which are spanned between said respective winding portions of both of said coils and said connected portions, wherein said winding portions of both of said coils, said terminals, said connected portions, and said crossover portions are sheathed with a resin material, a movable conductive short ring, which is connected to said rotational position-detected member so as to be in alignment therewith, said movable short ring being disposed to permit turning thereof relative to said arc portion of said sensing side portion, and said movable short ring shifting its position in relation to said arc portion of said sensing side portion according to the turning of said rotational position-detected member, thereby varying an inductance of said sensing side coil; and, a fixed conductive short ring, which is spaced apart at a predetermined distance from said referencing side coil of said arc portion of said referencing side portion, said fixed short ring correcting variations in the inductance of said sensing side coil due to the movement of said movable short ring, wherein the inductance of said sensing side coil is compared with an inductance of said referencing side coil, to provide an indication of the rotational position of said rotational position-detected member.

16. A rotational position sensor according to claim 15, wherein said magnetic core has a core intermediate portion, which is formed by a plurality of laminated thin plates, and core opposite end portions, which are disposed in a sealed state on the top and bottom surfaces of said core intermediate portion, each of said core opposite end portions being thicker than each of said laminated thin plates.

17. A rotational position sensor according to claim 15, wherein said core is made of sintered ferrite.

18. A rotational position sensor of an inductance type for detecting a rotational position of a rotational position-detected member, comprising:

a magnetic core having a substantial C-shape, which is disposed radially around said rotational position-detected member so as to be spaced apart from said rotational position-detected member, said magnetic core being provided with a referencing side portion having an arc shape for formation of a referencing side magnetic path and a sensing side portion having an arc shape for formation of a sensing side magnetic path, and said core having a core intermediate portion formed by a plurality of laminated thin plates and core opposite end portions disposed in a sealed state on the top and bottom surfaces of said core intermediate portion, each of said core opposite end portions being thicker than each of said laminated thin plates;

a referencing side coil formed by a lead wire being wound around said referencing side portion;

a sensing side coil formed by a lead wire being wound around said sensing side portion;

a movable conductive short ring, which is connected to said rotational position-detected member so as to be in alignment therewith, said movable short ring being disposed to permit turning thereof in relation to said sensing side portion, and said movable short ring shifting its position in relation to said sensing side portion according to the turning of said rotational position-detected member, thereby varying an inductance of said sensing side coil; and, a fixed conductive short ring, which is spaced apart at a predetermined distance from said referencing side coil of said referencing side portion, said fixed short ring correcting variations in the inductance of said sensing side coil due to the movement of said movable short ring, wherein the inductance of said sensing side coil is compared with an inductance of said referencing side coil, thereby detecting the rotational position of said rotational position-detected member.

19. A rotational position sensor according to claim 18, wherein said core intermediate portion and said core opposite end portions are rigidly secured together at given points.

20. A rotational position sensor according to claim 19, wherein said core intermediate portion and said core opposite end portions are welded together at not less than one point for each of the outermost circumference portions of said referencing side portion and said sensing side portion.

21. A rotational position sensor according to claim 18, wherein said core intermediate portion and said core opposite end portions are held together at given points by means of clips to avoid breaking loose from one another in a thickness direction.

22. A rotational position sensor of an inductance type for detecting a rotational position of a rotational position-detected member, comprising:

a magnetic core having a substantial C-shape, which is disposed radially around said rotational position-detected member so as to be spaced apart from said rotational position-detected member, said magnetic core being provided with a referencing side portion having an arc shape for formation of a referencing side magnetic path and a sensing side portion having an arc shape for formation of a sensing side magnetic path, and said core being made of sintered ferrite;

a referencing side coil formed by a lead wire being wound around said referencing side portion;

a sensing side coil formed by a lead wire being wound around said sensing side portion;

a movable conductive short ring, which is connected to said rotational position-detected member so as to be in alignment therewith, said movable short ring being disposed to permit turning thereof relative to said sensing side portion, and said movable short ring shifting its position in relation to said sensing side portion according to the turning of said rotational position-detected member, thereby varying an inductance of said sensing side coil; and, a fixed conductive short ring, which is spaced apart at a predetermined distance from said referencing side coil of said referencing side portion, said fixed short ring correcting variations in the inductance of said sensing side coil due to the movement of said movable short ring, wherein the inductance of said sensing side coil is compared with an inductance of said referencing side coil, thereby detecting the rotational position of said rotational position-detected member.

23. A substantially C-shaped magnetic core for use in an inductance-type rotational position sensor for detecting the rotational position of a rotational position-detected member, said core comprising:

a sensing side portion adapted for cooperation with a movable conductive short ring and having an arc shape for formation of a sensing side magnetic path;

a referencing side portion adapted for cooperation with a fixed conductive short ring having an arc shape for formation of a referencing side magnetic path, in which the center of a circle of said referencing side portion is spaced apart at a predetermined distance from the center of a circle of said sensing side portion in a direction in which said sensing side portion and said referencing side portion face one another in spaced relation.

24. A rotational position sensor according to claim 23, wherein said magnetic core comprises: a core intermediate portion, which is formed by a plurality of laminated thin plates; and, both core end portions, which are disposed in a sealed state on the top and bottom surfaces of said core intermediate portion, each of said core opposite end portions being thicker than each of said laminated thin plates.

25. A rotational position sensor according to claim 24, wherein said core intermediate portion and said core opposite end portions are rigidly secured together at given points.

* * * * *